US008570384B2

(12) United States Patent
Brown

(10) Patent No.: US 8,570,384 B2
(45) Date of Patent: Oct. 29, 2013

(54) CAMERA APPARATUS HAVING AN SMA ACTUATOR SYSTEM

(75) Inventor: Andrew Benjamin David Brown, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 167 days.

(21) Appl. No.: 13/146,475

(22) PCT Filed: Jan. 29, 2010

(86) PCT No.: PCT/GB2010/000154
§ 371 (c)(1),
(2), (4) Date: Jul. 27, 2011

(87) PCT Pub. No.: WO2010/089529
PCT Pub. Date: Aug. 12, 2010

(65) Prior Publication Data
US 2012/0019675 A1 Jan. 26, 2012

(30) Foreign Application Priority Data

Feb. 9, 2009 (GB) .................................. 0901987.8
May 21, 2009 (GB) .................................. 0908791.7
Oct. 19, 2009 (GB) .................................. 0918294.0

(51) Int. Cl.
H04N 5/228 (2006.01)
H04N 5/232 (2006.01)
H04N 5/225 (2006.01)
G02B 27/64 (2006.01)

(52) U.S. Cl.
USPC ....... 348/208.11; 348/357; 348/374; 396/554

(58) Field of Classification Search
USPC ....................... 348/208.7, 208.8, 208.11, 357
See application file for complete search history.

(56) References Cited

U.S. PATENT DOCUMENTS

| 6,516,146 | B1 | 2/2003 | Kosaka |
| 6,574,958 | B1 | 6/2003 | MacGregor |
| 7,663,811 | B2* | 2/2010 | Noda et al. ..................... 359/696 |
| 7,916,210 | B2* | 3/2011 | Hara et al. ..................... 348/373 |
| 8,068,167 | B2* | 11/2011 | Honda et al. .................. 348/357 |
| 8,077,411 | B2* | 12/2011 | Shyu et al. .................... 359/823 |
| 8,224,173 | B2* | 7/2012 | Takano et al. ................. 396/133 |

(Continued)

FOREIGN PATENT DOCUMENTS

| EP | 1 304 872 A1 | 4/2003 |
| EP | 1 640 757 A1 | 3/2006 |

(Continued)

Primary Examiner — John Villecco
(74) Attorney, Agent, or Firm — Harness, Dickey & Pierce, P.L.C.

(57) ABSTRACT

A camera apparatus capable of providing optical image stabilization comprises a support structure and a camera unit, that comprises an image sensor and a lens system for focussing an image thereon, supported on the support structure in a manner allowing it to tilt around two notional axes perpendicular to each other and to the optical axis. An SMA actuation system comprises two SMA actuator subsystems each comprising plural SMA actuators connected between the camera unit and the support structure. The SMA actuators of the respective SMA actuator subsystems are arranged, on contraction, to drive displacement of the camera unit in opposite directions along the optical axis. The SMA actuators of each SMA actuator subsystem are also arranged, on differential contraction, to drive rotation of the camera unit around a respective one of said notional axes.

17 Claims, 3 Drawing Sheets

(56) References Cited

U.S. PATENT DOCUMENTS

| | | |
|---|---|---|
| 8,350,959 B2 * | 1/2013 | Topliss et al. ............... 348/374 |
| 8,446,475 B2 * | 5/2013 | Topliss et al. ............ 348/208.11 |
| 2001/0025477 A1 | 10/2001 | Hara et al. |
| 2003/0076421 A1 * | 4/2003 | Dutta ..................... 348/208.11 |
| 2003/0079472 A1 | 5/2003 | Hara et al. |
| 2006/0150627 A1 | 7/2006 | Oohara |
| 2006/0272328 A1 | 12/2006 | Hara et al. |
| 2007/0109412 A1 | 5/2007 | Hara |
| 2007/0279497 A1 | 12/2007 | Wada et al. |
| 2008/0049109 A1 * | 2/2008 | Teramoto et al. .......... 348/208.7 |
| 2008/0085108 A1 | 4/2008 | Sekino et al. |
| 2008/0198249 A1 | 8/2008 | Tanimura et al. |
| 2008/0278030 A1 | 11/2008 | Hara et al. |
| 2008/0278590 A1 | 11/2008 | Tanimura et al. |
| 2009/0052037 A1 | 2/2009 | Wernersson |
| 2010/0074607 A1 * | 3/2010 | Topliss et al. ................ 396/133 |
| 2010/0098394 A1 | 4/2010 | Ishihara et al. |
| 2011/0249131 A1 * | 10/2011 | Topliss et al. ............... 348/208.7 |
| 2012/0106936 A1 * | 5/2012 | Lim et al. ........................ 396/55 |
| 2012/0224075 A1 * | 9/2012 | Lim et al. ................. 348/208.11 |

FOREIGN PATENT DOCUMENTS

| | | | |
|---|---|---|---|
| GB | 2434214 A | | 7/2007 |
| JP | 2002 130114 | | 5/2002 |
| JP | 2007078954 A | * | 3/2007 |
| JP | 2008040193 A | * | 2/2008 |
| KR | 2011094723 A | * | 8/2011 |
| WO | WO-03048831 A2 | | 6/2003 |
| WO | WO-2006059098 A1 | | 6/2006 |
| WO | WO-2007/113478 A1 | | 10/2007 |
| WO | WO-2008/099156 | | 8/2008 |
| WO | WO 2008099155 A1 | * | 8/2008 |
| WO | WO-2008-129291 A2 | | 10/2008 |
| WO | WO 2008117958 A1 | * | 10/2008 |
| WO | WO-2009/027775 A1 | | 3/2009 |
| WO | WO-2009/056822 A2 | | 5/2009 |
| WO | WO-2010029316 A2 | | 3/2010 |

* cited by examiner

CAMERA APPARATUS HAVING AN SMA ACTUATOR SYSTEM

CROSS-REFERENCE TO RELATED APPLICATIONS

This application is a 371 U.S. National Stage of International Application No. PCT/GB2010/000154, filed Jan. 29, 2010, and published in English as WO 2010/089529 A1 on Aug. 12, 2010. This application claims priority to United Kingdom Patent Applications GB 0901987.8, filed Feb. 9, 2009, GB 0908791.7, filed May 21, 2009, and GB 0918294.0, filed Oct. 19, 2009. The disclosures of the above applications are incorporated herein by reference.

The present invention relates to optical image stabilisation (OIS) of camera apparatus comprising an image sensor and a lens system for focussing an image on the image sensor.

The purpose of OIS is to compensate for camera shake, that is vibration of the camera apparatus typically caused by user hand movement, that degrades the quality of the image captured by the image sensor. OIS typically involves detection of the vibration by a vibration sensor such as a gyroscope sensor, and control on the basis of the detected vibration of an actuator system that adjusts the camera apparatus to compensate the captured image for the vibration.

Several techniques for adjusting the camera apparatus are known. One technique typically employed in digital stills cameras is to keep the position of the camera apparatus as a whole fixed (including the image sensor and most of the lens system) and to move one lens group in directions perpendicular to the optical axis. This technique is particularly suitable to large cameras as the lens group is of low size and inertia as compared to the remainder of the camera. An alternative technique is to keep the lens system still, and to move the image sensor in directions perpendicular to the optical axis.

Although these techniques are successful in relatively large camera apparatuses such as digital still cameras, they are difficult to miniaturise. The very tight packaging of components in miniature camera apparatuses presents great difficulties in adding OIS actuators within the desired package.

US-2006/0272328 discloses a camera apparatus in which a different technique is used to provide OIS. In particular, the camera unit including the image sensor and the lens system is supported on a support structure by an elastic support member that acts a physical pivot allowing tilting of the camera unit around two notional axes that are perpendicular to each other and to the optical axis. Two pairs of SMA wire are connected between the support structure and the camera unit, extending at an acute angle to the optical axis. The SMA wires of each pair are aligned opposite another in a push-pull configuration, without any resilient biasing, so that differential contraction drives tilting of the camera unit. The drive currents applied to the SMA wires are derived based on the output of a vibration sensor attached to the support structure to compensate for camera shake.

US-2006/0272328 teaches that a sufficiently high frequency response can be achieved by reducing the diameter of the SMA wire. Typically a perceived drawback of SMA as an actuator is its slow response time. As the SMA actuator is thermally driven, the response time is limited by the temperature rise and fall of the SMA material, which is associated with its thermal conductivity, specific heat capacity, and its thermal mass.

Therefore, OIS is achieved by tilting the camera unit in directions perpendicular to the optical axis. This is made possible because the size and inertia of the camera unit is small, and is beneficial so as to separate the OIS function from the other camera functions. In particular, it is unnecessary to alter the complex internal design of the camera unit, such as the highly toleranced optical components. Furthermore, by using SMA as an actuator, there is achieved the advantage of a very high energy density (mechanical energy available for a given mass of material). In other words, this allows the actuator system to be extremely small. Similarly, SMA actuators are able to deliver high forces. Both these factors mean that SMA actuators are highly suited to providing OIS for a miniature camera.

The camera apparatus disclosed in US-2006/0272328 suffers from disadvantage of requiring an elastic support member for the camera unit that acts a physical pivot for the tilting. The use of an elastic support member leads to transmission inefficiencies as it is not a true pivot. Replacement by a mechanism providing a true pivot, such as with a ball and socket joint, is difficult and leads to friction and hysteresis. To deal with this problem, one possible approach would be to provide a different form of suspension for the camera unit that allows movement of the camera unit along the optical axis, for example a plurality of resilient flexures. However, in that case the elastic support member would no longer be present and hence it would be necessary to provide a biasing force acting against the SMA actuators. This is straightforward to implement, for example using deformation of resilient flexures in a suspension system or by providing a separate biasing element.

Bearing in these points in mind, it would be desirable to reduce the power consumption and/or size of a camera apparatus in which OIS is provided by a technique in which the camera unit comprising an image sensor and a lens system is tilted around two notional axes that are perpendicular to each other and to the optical axis of the lens system.

According to the present invention, there is provided a camera apparatus comprising:

a support structure;

a camera unit comprising an image sensor and a lens system for focussing an image on the image sensor, the camera unit being supported on the support structure in a manner allowing the camera unit to tilt around two notional axes that are perpendicular to each other and to the optical axis of the lens system;

an SMA actuator system comprising two SMA actuator subsystems each comprising plural SMA actuators connected between the camera unit and the support structure, the respective SMA actuator subsystems being arranged, on contraction of the actuators thereof, to drive displacement of the camera unit in opposite directions along the optical axis relative to the support structure, and each SMA actuator subsystem being arranged, on differential contraction of the actuators thereof, to drive rotation of the camera unit around a respective one of said notional axes.

Such a camera apparatus allows OIS to be provided by tilting of a camera unit comprising an image sensor and a lens system in directions perpendicular to the optical axis, actuated by the SMA actuators. This allows an OIS function to be achieved with similar advantages to those set out above for US-2006/0272328 that it is unnecessary to alter the complex internal design of the camera unit and that the apparatus is compact due to the high energy density of SMA.

Each SMA actuator subsystem provides tilting around one of the notional axes perpendicular to the optical axis. As there are at least two actuators in an SMA subsystem, differential contraction thereof causes the camera unit to tilt. Since each SMA actuator delivers linear motion, differential contraction causes a tilting motion of the camera about a pivot point. In this way the two SMA subsystems together may provide the required tilt control in two orthogonal directions.

The two SMA actuator subsystems arranged, on contraction, to drive displacement of the camera unit in opposite directions along the optical axis and in this sense operate in opposition. That is to say when the actuators of one SMA actuator subsystem contract on heating, whilst the actuators of the other SMA actuator subsystem do not, the resultant displacement of the camera unit is in a first direction along the optical axis, but if the actuators of the other SMA actuator subsystem contract on heating, the resultant displacement of the camera unit is in a second, opposite direction along the optical axis. This configuration means that if both SMA actuator subsystems are heated to contract by the same controlled amount, the forces along the optical axis oppose each other and there will be no net movement. The SMA actuators can be driven with electrical signals to set a balance position away from any mechanism end stops, and in this way the two SMA actuation subsystems collectively define a virtual pivot point for the camera unit around which the tilting driven by either one of the SMA actuator subsystems occurs. In this way the position and attitude of the camera module can be accurately controlled, without the need for a separate fixed pivot provided by a suspension system for the camera unit.

In this way, the camera unit is provided with a balanced arrangement having a virtual pivot, which can be arbitrarily located, but is desirably located inside the camera unit, and along the optical axis. So, for example, the virtual pivot point may be located at the centre of mass of the camera unit. Having such control over the pivot point is beneficial, since if a real nonideal pivot is used, it will most simply be located outside the camera unit, for example at the position of the elastic block in the camera apparatus disclosed in US-2006/0272328, which means that any tilt is accompanied by an undesirable lateral shift of the camera unit relative to the optical axis.

As the SMA actuator subsystems each provide a force acting against the contraction of the other, this provides more active control of the stress cycle of the SMA actuators. Desirably, the apparatus is configured to develop a relatively high stress in the SMA actuators, whilst minimising the stress range. A high stress has the advantage of raising the temperature at which the stress in the SMA material is sufficient to cause contraction. This is desirable to increase the range of ambient temperatures at which the apparatus is usable. Conversely, keeping the stress range small over a large change in strain has the advantage of minimising fatigue effects. Minimising the stress range also has the effect of minimising the drive power required to change the phase of the SMA actuator and allow it to contract.

Furthermore, the stress can be controlled in response to the ambient temperature. The ability to control the tension in the wires means that the apparatus can be operated with a stress that that increases with ambient temperature. This means that a relatively low tension may be applied to the SMA actuators at low ambient temperatures below the natural transition temperature of the SMA wire, but increasing the tension in the SMA actuators at higher ambient temperatures to allow the full stroke to be achieved. In summary, the stress range may be controlled by mimimising the maximum stress experienced by the SMA actuators, while maintaining a high minimum stress in the SMA actuators at high ambient temperatures.

As compared to US-2006/0272328, the present invention avoids the need to mount the camera unit on the an elastic support member. Indeed in some embodiments the two actuator subsystems may themselves suspend the camera unit as they provide forces in opposite directions. In other embodiments, a separate suspension system for the camera unit may be provided, for example a plurality of flexures. Flexures provide numerous benefits as a suspension system. The flexures may be arranged to provide a low stiffness along the movement axis and a high stiffness perpendicular to the movement axis. Similarly, flexures experience a minimal degree of friction against movement, as compared for example to a bearing. Lastly, a suspension system formed by flexures is compact and straightforward to manufacture.

The present invention also avoids or at least reduces the requirement for any biasing force to be provided to act against the contraction of the SMA actuators, because each SMA actuator subsystem provides a force opposing contraction of the other. A biasing element may be avoided altogether or, if provided, may be reduced in size as compared to an equivalent system in which all the actuators drive movement of the camera unit in the same direction along the optical axis. Similarly, if the camera unit is suspended by flexures, the requirement for this to provide a biasing force is reduced, thereby simplifying the design.

In summary, therefore, the present invention solves the problem associated with providing a pivot point, whilst achieving the desire of operating SMA actuators against each other so as to minimise the number and size of the components, and the drive power of the actuators.

Advantageously, each SMA actuator comprises a piece of SMA wire connected at both ends to one of the camera unit and the support structure and intermediate its ends connected to the other of the camera unit and the support structure to connect it thereto. This arrangement of the SMA actuators advantageously minimises the size of the camera apparatus. This is particularly desirable for a miniature camera, for example intended for use in a portable electronic device.

The two portions of the piece of SMA wire extending between the camera unit and the support structure may each extend perpendicular to a common notional line radial of the optical axis. This has the advantage that the SMA actuators do not on contraction apply any resultant force perpendicular to the optical axis.

Alternatively, the two portions of the piece of SMA wire each extend at an angle of less than 90° to a common notional line radial of the optical axis. This has the advantage of increasing the length of the SMA wire that may be achieved in a given footprint of the device, albeit that the SMA actuators on contraction apply a resultant force perpendicular to the optical axis.

Advantageously, the camera unit further comprises a control circuit electrically connected to the portions of the SMA actuators that are connected to the camera unit for supplying drive signals thereto. This provides the advantage of simplifying the overall camera apparatus incorporating an OIS function because the camera unit includes an image sensor, itself having many electrical connections and typically requiring a printed circuit board. Thus electrical connections are made to both the SMA actuators and to the image sensor at the camera unit which simplifies the electrical arrangement, because of the common electrical routing through the camera unit, which would require electrical connections in any event. For example, the support structure may require no electrical connections at all.

Where the SMA actuators comprise hooked pieces of SMA wire, advantageously they are connected to the camera unit and hooked over the support structure to connect them thereto. This facilitates the making of an electrical connection from the control circuit to the ends of the pieces of SMA wire that are fixed to the camera unit. For example, the pieces of SMA wire are typically fixed to the camera unit by crimping members that crimp the SMA wire, which may conveniently also provide an electrical connection.

Advantageously, there may be mounted on the camera unit a vibration sensor arranged to generate output signals representative of the vibration of the camera unit, and in response to which the control circuit generates drive signals. This provides a technical improvement to the quality of the optical image stabilisation. This is because the control algorithm implemented by the control circuit now seeks to minimise the vibrations detected by the vibration sensor rather than to deliver an opposing correction to the tilts sensed. In practice this provides more reliable compensation than if the vibration sensor is mounted on the support structure. Furthermore, this simplifies the electrical arrangement in that the electrical connections to the vibration sensor is provided on the camera unit, which is particularly advantageous if the control circuit is also provided on the camera unit.

To allow better understanding, an embodiment of the present invention will now be described by way of non-limitative example with reference to the accompanying drawings, in which.

Figure 1:
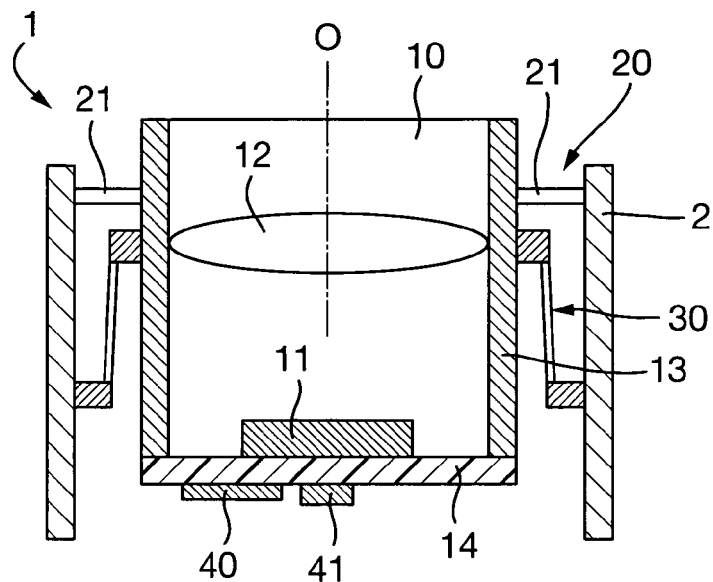
FIG. 1 is a schematic cross-sectional view of a camera apparatus.

A camera apparatus 1 arranged to perform OIS is shown schematically in FIG. 1 which is a cross-sectional view, the cross-section being taken along the optical axis O of the camera apparatus 1. The camera apparatus 1 is to be incorporated in a portable electronic device such as a mobile telephone, media player or portable digital assistant. Thus miniaturisation is an important design criterion.

The camera apparatus 1 comprises a support structure 2 and a camera unit 10 that is supported on the support structure 2 by a suspension system 20 that is described detail below. The camera apparatus also includes an SMA actuator system 30 connected between the support structure 2 and the camera unit 10, that is also described in detail below.

The camera unit 10 is a functional camera and comprises an image sensor 11 and a lens system 12, both supported on a camera support 13. The camera unit 10 has a printed circuit board (PCB) 14 on its bottom surface to which the image sensor 11 is mounted and connected. The lens element 12 and the image sensor 11 are arranged along the optical axis O so that the lens system 12 focuses an image onto the image sensor 11. The image sensor 11 captures the image and may be of any suitable type for example a CCD (charge-coupled device) or a CMOS (complimentary metal-oxide-semiconductor) device. The camera unit 1 is a miniature camera having one or more lenses with a diameter of at most 10 mm.

As described further below, OIS is provided by tilting the entire camera unit 10 around axes that are perpendicular to the optical axis O, with the advantage that the internal construction of the camera unit 10 need not be adapted for this purpose. Thus, the camera unit 10 may be a functionally standard camera. Thus, the camera unit 10 may have any desired construction to provide the desired optical performance, irrespective of the OIS function. For example, the camera unit 10 may include a lens system 12 comprising a single lens or plural lenses as needed to provide the desired balance of optical performance and cost. Similarly the lens system 12 may provide a fixed focus or a variable focus. In the latter case, the camera unit 10 may employ any suitable construction for varying the focus, including the use of an SMA actuator system. For example, the camera unit 10 may be a camera of the type described in WO-2007/113478, WO-2008/099156 or WO-2009/056822.

The suspension system 20 comprises a set of flexures 21 each connected between the support structure 2 and the camera unit 10 to support the camera unit 10 on the support structure 2. The flexures 21 are arranged as beams having a greater width as viewed along the optical axis O than thickness as viewed perpendicular to the optical axis O to allow deflection along the optical axis O while resisting movement perpendicular to the optical axis O. Thus, the flexures 21, upon deflection thereof, allow movement of the camera unit 10 along the optical axis O and also tilting of the camera unit 10 around two notional axes that are perpendicular to each other and to the optical axis O. Such tilting around two perpendicular axes in general allows tilting of the camera unit 10 about any arbitrary axis perpendicular to the optical axis O.

The flexures 21 may have a variety of arrangements but are typically spaced symmetrically around the camera unit 10 to provide similar stiffness against motion in different directions perpendicular to the optical axis O. For example, if the camera unit 10 is square as viewed along the optical axis O, then one or two flexures may be disposed on each side of the camera unit 10. In this case the suspension system 20 allows tilting of the camera unit 10 around a notional axis that is perpendicular to the optical axis O, upon differential deflection of the flexures 21 arranged on opposite sides of the camera unit 10.

The entire suspension system 20 consisting of all the flexures 21 may be formed from a single piece of material, typically a metal, although each of the flexures 21 could equally be formed as a separate element.

The use of flexures 21 as compared to other types of suspension system provides advantages, in particular being compact and straightforward to manufacture whiles providing a low stiffness along the optical axis O and a high stiffness in perpendicular directions. Similarly, the flexures 21 experience a minimal degree of friction against movement as compared to other suspension systems, for example a bearing. However, the suspension system 20 is optional in that the camera unit 10 could alternatively be supported solely by the SMA actuator system 30 that will now be described. In this case, the camera unit 10 has no restraints on its movement except as imposed by the SMA actuator system 30 and so the camera unit 10 remains able to tilt around two axes perpendicular to the optical axis O, that is upon actuation of the SMA actuation system 30 as described below.

Figure 2:
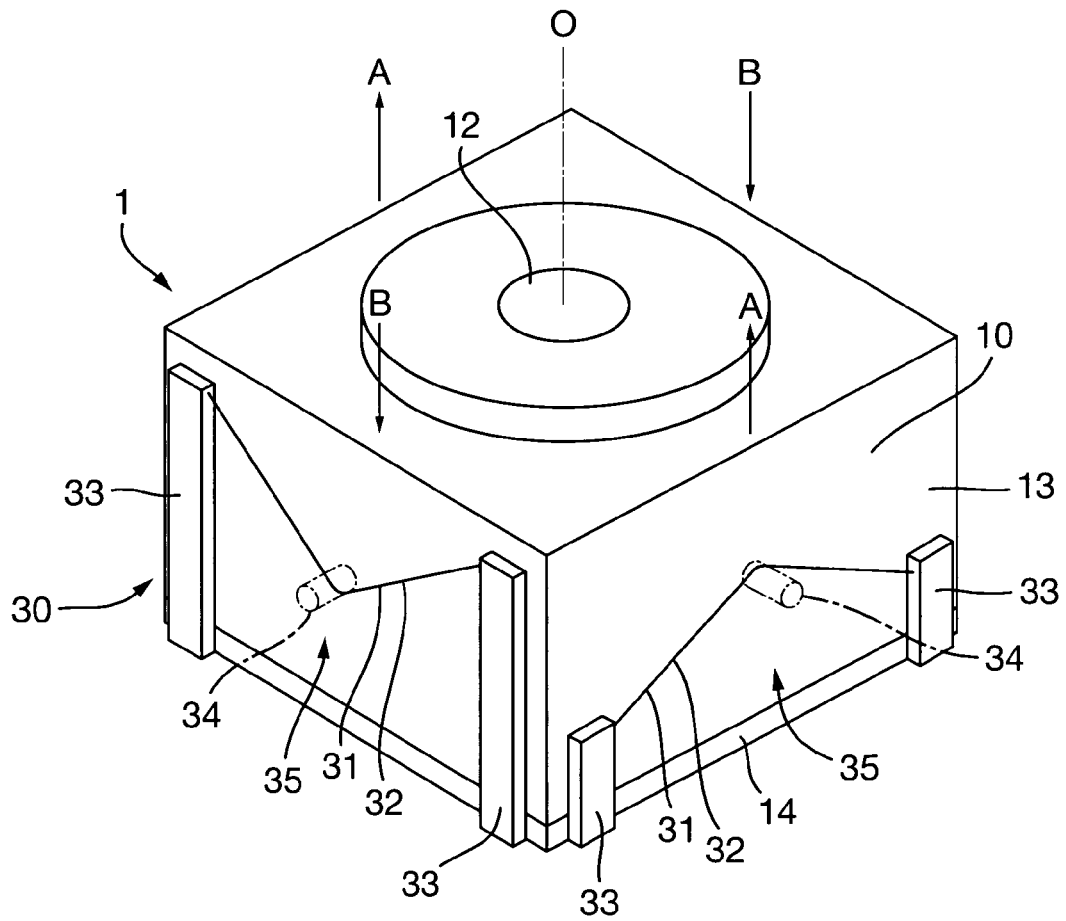
FIG. 2 is a perspective view of a first arrangement of the camera apparatus omitting its support structure.

A first arrangement for the SMA actuator system 30 is shown in FIG. 2 which is a perspective view of the camera apparatus 1 with the support structure 2 and suspension system 20 omitted for clarity. As can be seen, the camera unit 10 is square as viewed along the optical axis O. The SMA actuator system 30 comprises four SMA actuators 31 arranged as follows. Two of the actuators 31 are visible in FIG. 2, there being two more actuators 31 on the opposite sides of the camera unit 10 that are mirror images the two actuators 31 that can be seen, in perpendicular notional planes through the optical axis O.

Each SMA actuator 31 comprises a piece of SMA wire 32 mounted between two crimping members 33 that crimp the piece of SMA wire 32 at each end, thereby providing a mechanical terminal. The crimping members 33 are each fixed to the camera support 13 to provide mechanical connection of the SMA actuator 31 to the camera unit 10, possibly via an intermediate component (not shown) depending on the chosen assembly method and manufacturing philosophy. This mounting may be achieved by a mechanical fitting, strengthened by the use of adhesive. Alternatively, this mounting may be achieved by some kind of heat staking process if the camera support 13 is made from polymer material and has suitable heat deformable features to retain the crimping members 33. The crimping members 33 of each SMA actuator 31 are located at opposite ends of a respective side of the camera unit 10 so that the piece of SMA wire 32 extends along a side of the camera unit 10 perpendicular to a notional line radial of the optical axis O.

In addition, the crimping members 33 provide electrical connections to the piece of SMA wire 32, allowing a drive current to be supplied through the piece of SMA wire 32. The crimping members 33 are electrically connected to the PCB 14 on the lowermost side of the camera unit 10, for example by being soldered to appropriate pads provided on the PCB 14. The PCB 14 mounts an integrated circuit (IC) chip 40 in which is implemented a control circuit 42, described further below, for generating drive signals for supply to the SMA actuators 31 via the PCB 14. Thus the control circuit 42 is electrically connected to the portions of the SMA actuators 31 that are connected to the camera unit 10. This simplifies the overall camera apparatus 1 because both the control circuit 42 and the image sensor 11 are mounted in the camera unit 10 to the PCB 14 which simplifies the making of electrical connections thereto.

The PCB 14 also mounts a gyroscope sensor 41 that outputs a signal representative of the angular velocity of the camera unit 10, thereby acting as a vibration sensor that detects the vibrations that the camera unit 10 is experiencing. The gyroscope sensor 41 is typically a pair of miniature gyroscopes, for detecting vibration around two axes perpendicular to each other and the optical axis, although in general larger numbers of gyroscopes or other types of vibration sensor could be used. The control circuit 42 in the IC chip 40 is supplied with the output signals from the gyroscope sensor 41 and generates the drive signals on the basis thereof, as described in more detail below. Provision of the gyroscope sensor 41 on the camera unit 10 rather than the support structure 2 improves the quality of the OIS because the control algorithm seeks to minimise the detected vibrations rather than to deliver an opposing correction to the sensed tilt of the support structure 2. Furthermore the overall camera apparatus 1 is simplified because, in addition to the control circuit 42 and the image sensor 11, the gyroscope sensor 41 is also mounted in the camera unit 10 to the PCB 14 so electrical connections to all these components are easily made.

The piece of SMA wire 32 of each SMA actuator 31 is hooked over a respective hook 34 (shown in dotted outline) which is part of the support structure 2. Thus, each piece of SMA wire 32 extends between the camera unit 10 and the support structure 2 at an acute non-zero angle to the optical axis O. In each SMA actuator 31, the piece of SMA wire 32 is held in tension, thereby applying a component of force in a direction along the optical axis O. The two portions of the piece of SMA wire 32 extending between the camera unit 10 and the support structure 2 on either side of the hook 34 each extend perpendicular to a common notional line radial of the optical axis O, as a result of the SMA wire 32 being arranged along a side of the camera unit 10. Thus there is no component of force perpendicular to the optical axis O which is advantageous in that the SMA actuators 31 do not apply sideways forces to the camera unit 10.

However, each of the pairs of actuators 32 arranged opposite one another are arranged so that this component of force is applied in a different direction. That is, the SMA wires 32 of one pair of actuators 31 extend upwardly (as shown in FIG. 2) from the crimping members 34 to the hook 34 and thereby apply a component of force to the camera unit 10 in the direction A upwardly, whereas the SMA wires 32 of the other pair of actuators 31 extend downwardly (as shown in FIG. 2) from the crimping members 34 to the hook 34 and thereby apply a component of force to the camera unit 10 in the opposite direction B downwardly. For ease of reference, the pairs of SMA actuators 31 will therefore be referred to as respective SMA actuator subsystems 35 of the SMA actuator system 30.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the piece of SMA wire 32 causes it to decrease in length.

On heating of one of the SMA actuators 31, the stress therein increases and the SMA actuator 31 contracts. This causes movement of the camera unit 10 connected to the flexure element 21 along the optical axis 0. A range of movement occurs as the temperature of the SMA actuator 31 increases over the range of temperature in which there occurs the transition of the SMA material from the Martensite phase to the Austenite phase. Conversely, on cooling of the SMA actuator 31 so that the stress therein decreases, and expansion of the SMA actuator 31 allows the camera to move in the opposite direction.

The position of the camera unit 10 relative to the support structure 2 along the optical axis O is controlled by varying the temperature of the SMA actuators 31. This is achieved by passing through the SMA actuator 31 a drive current that provides resistive heating. Heating is provided by the drive current. Cooling is provided by reducing or ceasing the drive current to allow the SMA actuator 31 to cool by conduction to its surroundings.

The degree of displacement achievable along the optical axis O is dependent on the strain developed within the SMA actuator 31 and also on the acute angle of the piece of SMA wire 32 extending between the camera unit 1 and the support structure 2 with respect to the optical axis O. The strain which may be developed in the SMA wire 32 is limited by the physical phenomenon of the phase change. Due to the SMA wire 32 extending at an acute non-zero angle to the optical axis O, the SMA wire 32 changes in orientation when it changes in length. This effectively gears the movement so that the degree of displacement along the optical axis O is higher than the change in length of the SMA wire resolved along the optical axis O.

The SMA wire 32 may be made of any suitable SMA material, for example Nitinol or another Titanium-alloy SMA material. Advantageously, the material composition and pretreatment of the piece of SMA wire 32 is chosen to provide phase change over a range of temperature that is above the expected ambient temperature during normal operation and as wide as possible to maximise the degree of positional control.

As a result of the arrangement of the SMA actuators 31, the SMA actuators 31 of the respective SMA actuator subsystems 35, on contraction, drive displacement of the camera unit 10 in opposite directions along the optical axis O. Accordingly, the respective SMA actuator subsystems 35 apply a stress to each other. This stress can be controlled by varying the heating of the SMA actuators 31. To control the stress, the drive signals applied to the actuators 31 includes a common component that is common to both respective SMA actuator subsystems 35. Varying the level of the common component varies the stress in the actuators 31. This provides active control of the stress cycle of the SMA actuators 31. The camera apparatus 1 is configured to develop a relatively high stress in the SMA actuators 31, whilst minimising the stress range. A high stress raises the temperature at which the stress in the SMA material is sufficient to cause contraction. The common component may therefore be varied in response to the ambient temperature, being increased with increasing ambient temperature. Conversely, keeping the stress range small over a large change in strain has the advantage of minimising fatigue effects. Minimising the stress range also has the effect of minimising the drive power required to change the phase of the SMA actuator 31 and allow it to contract.

At the same time, the SMA actuators 31 of each SMA actuator subsystem 35, on differential contraction, drive rotation of the camera unit 10 around respective notional axes perpendicular to each other and to the optical axis O. Hence, the actuators 31 of the SMA actuator system 30 as a whole may be driven to provide tilting about any arbitrary notional axis perpendicular to the optical axis O. The configuration of the SMA actuator system 30 creates the desired virtual pivot for the camera unit 10 by operating all the SMA actuators 30 with a controlled drive signal. The drive signals applied to the SMA actuators 31 of each SMA actuator subsystem 35 include a differential component selected to provide the desired tilt around the respective notional axis. These differential component may be modified by various compensation algorithms to compensate for non-linear effects such as hysteresis in the SMA material.

The differential component may be applied in any manner. Most conveniently, the differential component may be generated based on a measurement of the resistance of the SMA actuators 31. With this approach a target resistance for each SMA actuator 31 may be varied differentially for each SMA actuator 31 (i.e. increasing in one SMA actuator 31 so that heating is demanded when decreasing in the other SMA actuator 31 so that cooling is demanded, and vice versa), and then the drive signal of each SMA actuator 31 may be varied independently to drive the measured resistance to the target resistance. This will have the effect of a differential component being applied as between the two SMA actuators 31. Alternatively, the differential component may be applied for the SMA actuator subsystem 35 as a whole and then applied to the two SMA actuators 31 thereof, for example being applied inversely to both SMA actuators 31 or being applied to just one of the SMA actuators 31.

The SMA actuators 31 may be driven to provide tilting with a high degree of positional control, as a result of the suspension system 20 allowing the camera unit 10 to move along the optical axis O and the SMA actuators 31 driving displacement along the optical axis O. As OIS is achieved by tilting of the camera unit 10 as a whole, this has the advantage that by separating the OIS function from the other camera functions the internal design of the camera unit 10 is unaffected. This is particularly straightforward in the case of a miniature camera unit 10 because of its small size and inertia.

One of the key advantages of SMA material as an actuator technology is its very high energy density (mechanical energy available for a given mass of material). This allows the SMA actuators 31 and associated mechanisms to be extremely small, and in particular vertically compact, with the result that only a small increase in size of the camera apparatus 1 is needed to provide OIS. The SMA actuators 31 are also able to deliver high forces. Both these factors make SMA highly suited to providing the actuator for an OIS system for a miniature camera unit 10.

In addition, it has been appreciated that the SMA actuators 31 may be provided with a sufficient speed of response to provide OIS. Typically each SMA actuator 31 is proportionally driven so as to control the position over a frequency bandwidth up to 10 Hz, up to 20 Hz, or up to 30 Hz. A perceived drawback of SMA as an actuator is its slow response time. As an SMA actuator 31 is thermally driven, the response time is limited by the temperature change achievable, being associated with thermal conductivity, specific heat capacity, and thermal mass.

Whilst heating of the SMA wire can be increased by increasing the power of the drive current, cooling is dependent on the thickness of the piece of SMA wire 32. This thickness is selected to provide the desired response time during cooling. For example, if the SMA wire 32 is of thickness 25 μm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 μm at over 20 Hz).

Surprisingly, in spite of the roll-off in SMA wire response above 4 Hz, the SMA wire 32 is still able to deliver the displacement requirements at 30 Hz, and so the SMA actuators 31 are able to successfully meet the actuation requirements of the OIS for miniature cameras.

Figure 3:
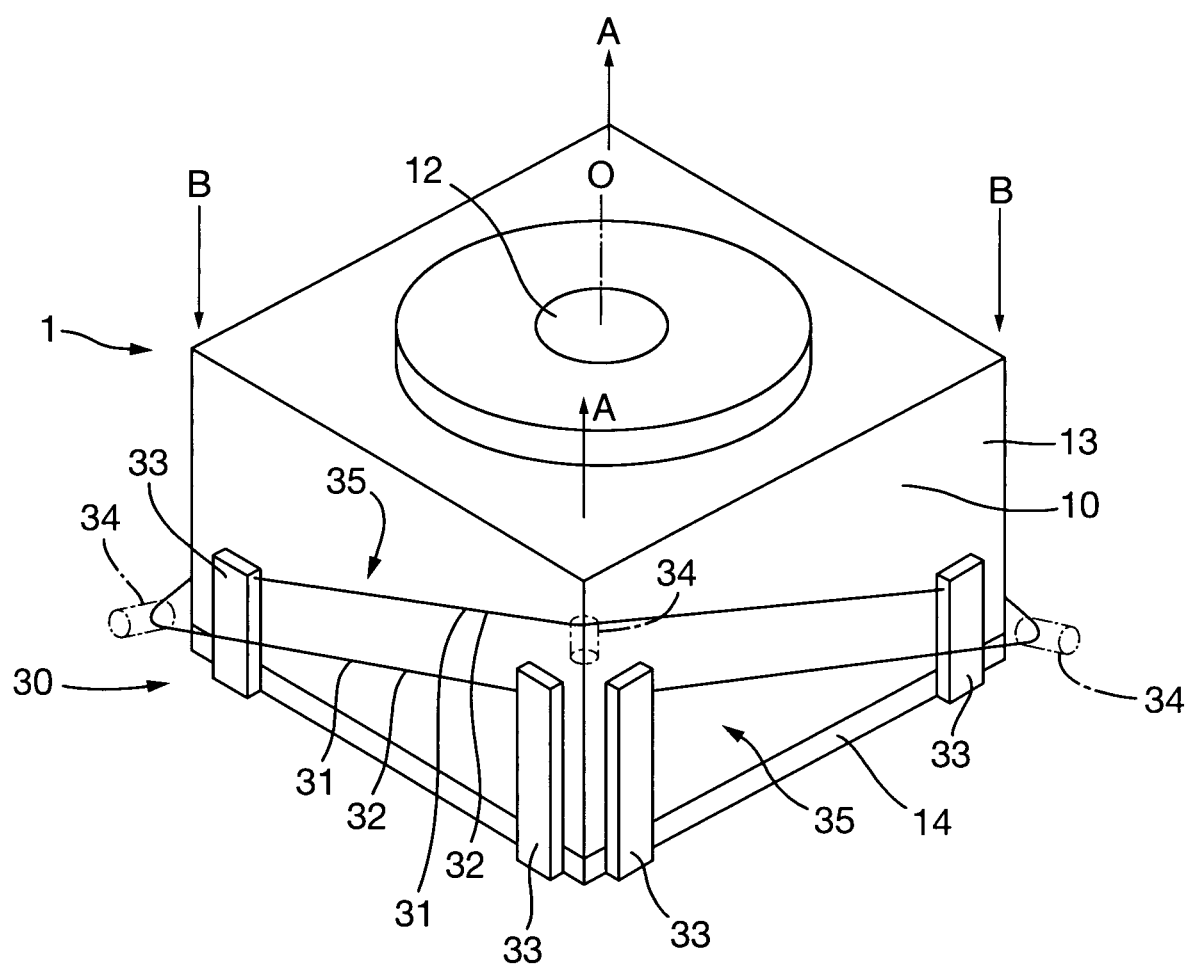
FIG. 3 is a perspective view of a second arrangement of the camera apparatus omitting its support structure.

A second arrangement of the SMA actuator system 30 is shown in FIG. 3 which is a perspective view of the camera apparatus 1 similar to that of FIG. 2. The second arrangement is the same as the first arrangement except that the four SMA actuators 31 are arranged at different positions around the camera unit 10. The SMA actuators 31 are still formed as a piece of SMA wire 32 hooked over a respective hook 34 (shown in dotted outline) which is part of the support structure 2, and are arranged as two SMA actuator subsystems 35 that are functionally the same as those of the first arrangement. However, instead of the hook 34 being central on a side of the camera unit 10 so that the portions of the SMA wire 32 on each side of the hook 34 extending along the same side of the camera unit 10, the hook 34 is arranged in a corner of the camera unit 10 so that the portions of the SMA wire 32 on each side of the hook 34 extend along adjacent sides of the camera unit 10. Thus these portions of the SMA wire 32 extend at 90° to each other and at 45° to a common notional line radial of the optical axis O. This provides the advantage of increasing the length of SMA wire 32 as a whole in the SMA actuator system 30 within the packaging constraints imposed to minimise the size, thereby increasing the amount of tilt correction available. Such an advantage may be achieved more generally by arranging the SMA actuators with any angle of less than 90° to a common notional line radial of the optical axis O. On the other hand, in this case each actuator 31 generates a component of force perpendicular to the optical axis O. A disadvantage is that this lateral force potentially generates a tilt of the camera unit 10. However, the common component of the drive signals generates lateral forces in the opposing SMA actuators 31 of each SMA actuator subsystem 35 that balance each other, so differential lateral forces are only generated by the differential components of the drive signals. The suspension system 20 is designed to be sufficiently stiff to resist such lateral forces.

As an alternative in both the first and second arrangements of the SMA actuator system 30, the SMA actuators 34 may be fixed to the support structure 2 at each end of the piece of SMA wire 32 and hooked over a hook 34 provided on the camera unit 10.

Figure 4:
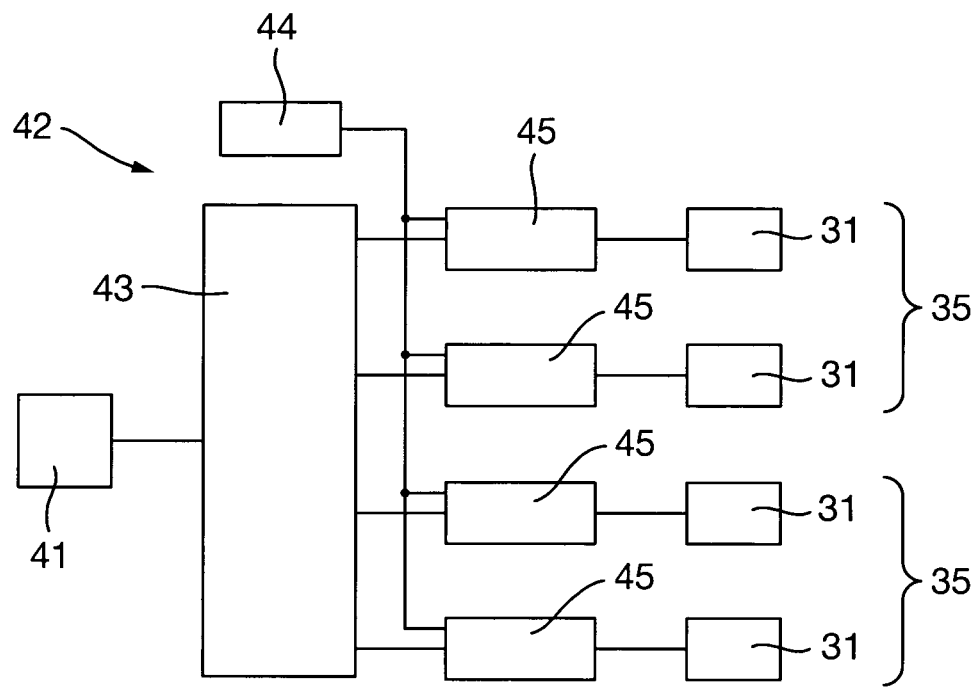
FIG. 4 is a diagram of a control circuit for generating drive signals for the SMA actuators.

The control circuit 42 for generating the drive signals for the SMA actuators 31 is shown in FIG. 4 and will now be described.

The control circuit 42 comprises an SMA tilt controller 43 that is supplied with the output signal of the gyroscope sensor 41 and in response thereto generates a tilt control signal in respect of each SMA actuator 31. The SMA tilt controller 43 may be implemented in a processor and generates the tilt control signals in accordance with a control algorithm. The tilt control signals are representative of the degree of actuation required from the respective SMA actuators 31 to compensate for the vibration represented by the output signal of gyroscope sensor 41. Thus the tilt control signals for a pair of opposing SMA actuators 31 are generated to provide a differential displacement providing the required degree of tilt around the corresponding notional axis perpendicular to the optical axis O. Effectively this means that the difference between the tilt control signals is representative of the demanded angle of tilt around that axis.

Ideally, the gyroscope sensor 41 is aligned to provide two output signals representative of the tilt around perpendicular axes aligned with the axes around which each pair of opposed SMA actuators 31 is capable of tilting the camera unit 10. In this case, the tilt control signals for each pair of opposed SMA actuators 31 is derived from a single one of the output signals. However, in the case of misalignment, or a gyroscope sensor 41 that provides more output signals, the tilt control signals for each pair of opposed SMA actuators 31 is derived from a linear combination of the output signals.

As the gyroscope sensor 41 is fixed to the camera unit 10, so the output signals are representative of the vibration of the camera unit 10, OIS is effected by tilting the camera unit 10 in a manner tending to reduce these vibrations. Accordingly, the SMA tilt controller 43 generates tilt control signals providing a demanded angle of tilt reduces the actual tilt as measured by the gyroscope sensor 41. In practical terms, this means that it is easier to provide more accurate compensation than if the gyroscope sensor 41 were mounted on the support structure 2 by applying proportional control of the SMA actuators 31 in the drive circuits 45 with a high gain between the output of the gyroscope sensor 31 and the SMA actuators 31.

However, as an alternative, the gyroscope sensor 41 may be mounted on the support structure 2. In that case the output signals are representative of the vibration of the support structure 2. Such vibration will always be present and OIS is effected by tilting the camera unit 10 in opposition. Accordingly, the SMA tilt controller 43 generates control signals providing a demanded angle of tilt which is opposite to the actual tilt as measured by the gyroscope sensor 41.

The control circuit 42 also comprises a stress controller 44 that generates a stress control signal that is supplied in common to each SMA actuator 31. The stress control signal represents the desired stress in the SMA actuators 31 and may be varied in response to the ambient temperature, that itself may be determined by a temperature sensor (not shown) or from measured electrical parameters of the SMA actuators 31.

Figure 5:
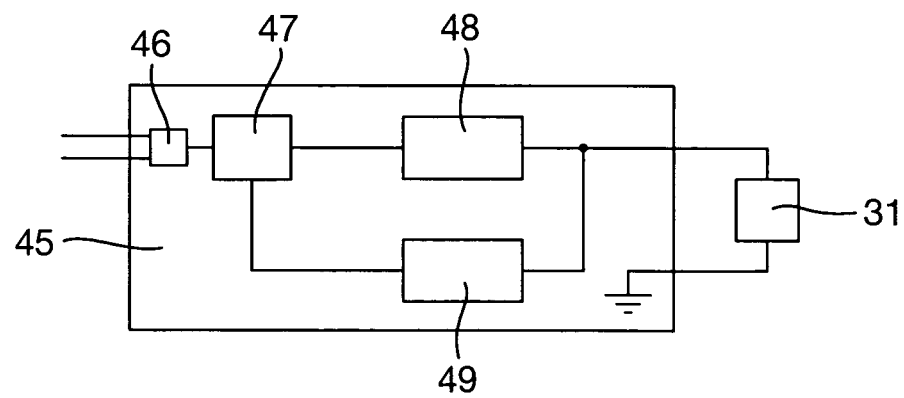
FIG. 5 is a diagram of the drive circuit of the control circuit.

Each SMA actuator 31 has a respective drive circuit 45 that is supplied with the common stress control signal and the respective tilt control signal, that generates a drive signal in accordance therewith and that supplies the drive signal to the SMA actuator 31. The drive circuits 45 have identical arrangement as shown in FIG. 5.

The drive circuit 45 includes a combination circuit 46 that combines the received stress control signal and tilt control signal to generate an overall drive signal representative of a target resistance for the SMA actuator controlled by the respective drive circuit 45. In the simplest case, this may be done simply by summing the received stress control signal and tilt control signal, with appropriate scaling. For greater accuracy, the overall control signal may be modified by a compensation algorithm to compensate for non-linear effects.

The drive circuit 45 also includes a drive controller 47 that is supplied with the overall control signal from the combination circuit 46 and controls a driver 48 using resistance feedback. The drive controller 47 may be implemented in a processor. Although the SMA tilt controller 43, the stress controller 44 and the drive controllers 45 are illustrated as separate components of ease understanding, they may be implemented in a common processor.

The driver 48 is connected to supply the drive current to the SMA actuator 31. The driver 48 may be a constant-voltage current source or a constant-current current source. For example, in the latter case the constant current might be of the order of 120 mA.

The drive circuit 45 further includes a detection circuit 49 arranged to detect the resistance of the SMA actuator 31. In the case that the driver 48 is a constant-current current source, the detection circuit 49 may be a voltage detection circuit operable to detect the voltage across the SMA actuator 31 which is a measure of the resistance of the piece of SMA wire 32. In the case that the driver 48 is a constant-voltage current source, the detection circuit 49 may be a current detection circuit. For a higher degree of accuracy the detection circuit 49 may comprise a voltage detection circuit and a current detection circuit operable to detect both the voltage and current across the SMA actuator and to derive a measure of resistance as the ratio thereof.

The drive controller 47 is arranged to control the driver 48 to supply a pulse-width modulated current. The drive controller 47 receives the resistance measured by the detection circuit 49 and uses it as a feedback signal in a closed-loop control algorithm to control the PWM duty cycle of the driver 48 to actuate the SMA actuator 31 in accordance with the demand represented by the overall control signal. The closed-loop control may be proportional.

By using the electrical resistance of the SMA actuator 31 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

Although this drive circuit 47 and its algorithm is very successful in controlling the SMA actuator 31, owing to the natural variation in SMA material properties from batch to batch, and other manufacturing tolerances, such as spring stiffnesses and assembly placement tolerances, the actual change in tilt of the camera unit 10 that corresponds to a certain change in the demanded tilt will have some variance, perhaps only being accurate to approximately 10%.

This variance can be reduced in a number of ways.

In the case of the first arrangement, one convenient approach is to encapsulate the accuracy error of the SMA actuators 31 is to consider it as an error in the SMA drive control gain, for example the gain between the displacement of each SMA actuator 31 and its electrical resistance. The change in position that corresponds to a specific (quasi-linear) change in resistance corresponds to the gain, and hence all the errors can be considered as an error in this gain. This gain may be calibrated for individual camera apparatuses 1 during manufacture on the basis of measurements of the displacement of the actuators 31.

Another approach is to dispose the gyroscope sensor 41, or other vibration sensor, on the camera unit 10, so that they sense the actual vibration of the camera unit 10. This provides a number of advantages.

Firstly, the aim of the OIS control algorithm becomes minimising the vibrations detected by the gyroscope sensor 41, rather than delivering an opposing correction to the detected tilt. The output signals of the gyroscope sensor 41 senses the actual vibrations irrespective of whether the camera vibrations are due to a base excitation of the system, such as user handshake, or due to errors in the accuracy of the SMA control gain. Thus, it becomes possible to optimise the gain of the SMA actuator 31 to minimise the tilt sensed by the gyroscope sensor 41. In particular, the control circuit 42 has an adjustable gain and is arranged to adjust its gain to minimise the sensed vibrations. The overall gain may be adjusted by adjustment of the gain of the SMA tilt controller 43 and/or the drive controller 47

Secondly, the gyroscope sensor 41 can be mounted on the same PCB 14 as used to mount the image sensor 11, which is convenient for electrical connections, and also provides a convenient place to mount the control circuit 42.

An alternative scheme is to use a dedicated calibration routine in which the control circuit 42 demands a deliberate vibration from the SMA actuators 31, and the induced vibrations are then sensed by the gyroscope sensor 41, and so the actual tilt vibrations can be assessed. Based on the output signals of the gyroscope sensor 41, the gain is adjusted until the demanded tilts match the measured tilts. This scheme assumes the base excitation vibrations can be ignored or deconvolved from the sensed vibrations.

As there are a plurality of separate SMA actuators 31, each one can have a variable gain that can be separately optimised as part of the algorithm described above.

What is claimed is:

1. A camera apparatus comprising:
a support structure;
a camera unit comprising an image sensor and a lens system for focussing an image on the image sensor, the camera unit being supported on the support structure in a manner allowing the camera unit to tilt around two notional axes that are perpendicular to each other and to the optical axis of the lens system;
an SMA actuator system comprising two SMA actuator subsystems each comprising plural SMA actuators connected between the camera unit and the support structure, one of the SMA actuator subsystems being arranged, on contraction of the actuators thereof, to drive displacement of the camera unit in a first direction along the optical axis relative to the support structure, the other of the SMA actuator subsystems being arranged, on contraction of the actuators thereof, to drive displacement of the camera unit in a second direction, opposite to the first direction, along the optical axis relative to the support structure, and each SMA actuator subsystem being arranged, on differential contraction of the actuators thereof, to drive rotation of the camera unit around a respective one of said notional axes.

2. An apparatus according to claim 1, wherein the two SMA actuator subsystems each comprise two SMA actuators disposed on opposite sides of the camera unit.

3. An apparatus according to claim 1, wherein each SMA actuator comprises SMA wire.

4. An apparatus according to claim 1, wherein each SMA actuator comprises a piece of SMA wire connected at both ends to one of the camera unit and the support structure and intermediate its ends hooked over the other of the camera unit and the support structure to connect it thereto.

5. An apparatus according to claim 4, wherein the two portions of the piece of SMA wire extending between the camera unit and the support structure each extend perpendicular to a common notional line radial of the optical axis.

6. An apparatus according to claim 4, wherein the two portions of the piece of SMA wire extending between the camera unit and the support structure each extend at an angle of less than 90° to a common notional line radial of the optical axis.

7. An apparatus according to claim 4, wherein said one of the camera unit and the support structure is the support structure and said other one of the camera unit and the support structure is the camera unit.

8. An apparatus according to claim 1, wherein the camera unit further comprises a control circuit electrically connected to the portions of the SMA actuators that are connected to the camera unit for supplying drive signals thereto.

9. An apparatus according to claim 8, wherein the camera unit further comprising a vibration sensor mounted thereon and arranged to generate output signals representative of the vibration of the camera unit, the control circuit being arranged to generate the drive signals in response to the output signals of vibration sensor.

10. An apparatus according to claim 9, wherein the control circuit has an adjustable gain and is arranged to adjust its gain to minimise the sensed vibrations.

11. An apparatus according to claim 9, wherein the vibration sensor is arranged to generate output signals representative of the angular velocity of the camera unit.

12. An apparatus according to claim 11, wherein the vibration sensor is a gyroscope sensor.

13. An apparatus according to claim 8, wherein the control circuit is arranged to supply drive signals including a common component that is common to both SMA actuator subsystems for controlling the stress in the actuators.

14. An apparatus according to claim 13, wherein the common component is varied on the basis of the ambient temperature.

15. An apparatus according to any claim 1, wherein the camera unit is supported on the support structure by a suspension system.

16. An apparatus according to claim 15, wherein the suspension system comprises a plurality of flexure elements.

17. An apparatus according to any claim 1, wherein the camera unit is supported on the support structure by the SMA actuator system.

* * * * *